June 15, 1937.  A. E. W. JOHNSON ET AL  2,083,713
PICKER ARM FOR POTATO PLANTERS
Filed June 5, 1935
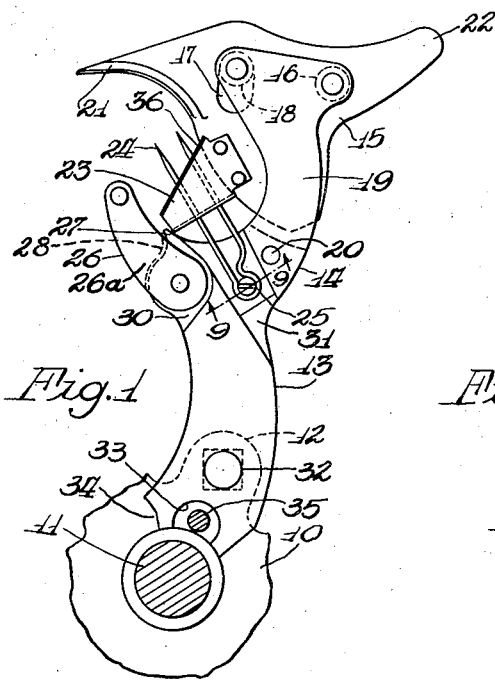
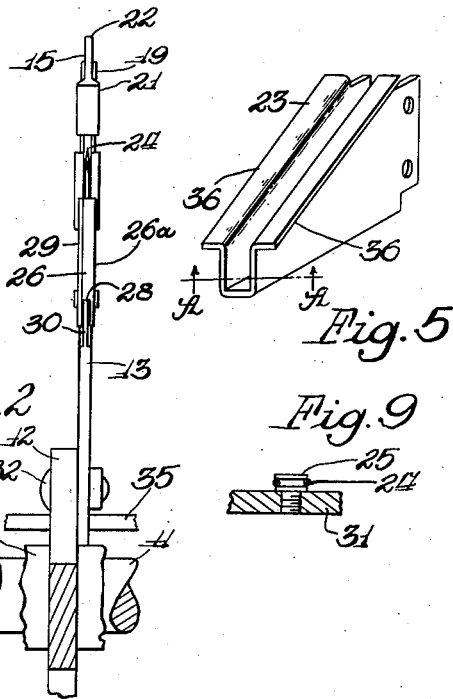
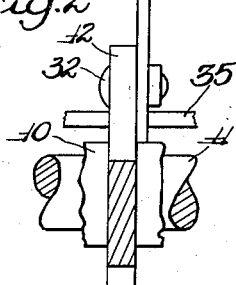
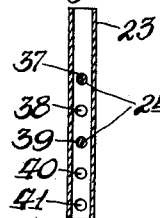
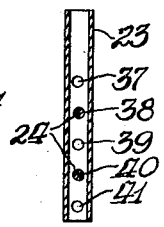
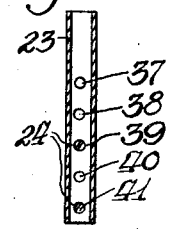
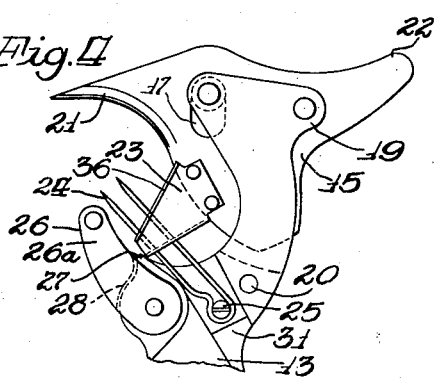
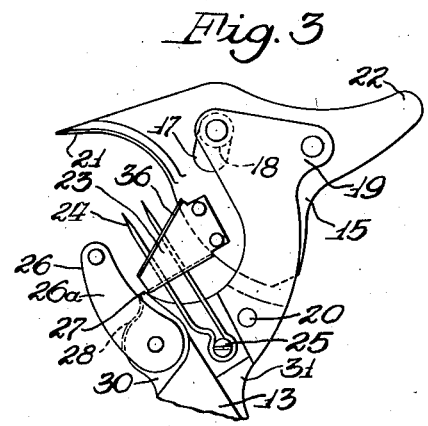
Inventors
Arnold E. W. Johnson
Joseph I. Mitchell
By V. F. Larragne
Atty.

Patented June 15, 1937

2,083,713

UNITED STATES PATENT OFFICE 2,083,713

PICKER ARM FOR POTATO PLANTERS

Arnold E. W. Johnson, Chicago, Ill., and Joseph I. Mitchell, Auburn, N. Y., assignors to International Harvester Company, a corporation of New Jersey Application June 5, 1935, Serial No. 25,030

8 Claims. (Cl. 221—133)

This invention relates to potato planters of the type in which a series of pickers are caused to revolve around a shaft over a receiver for potatoes, these pickers having prongs to empale a piece of seed potato and slotted concaves arranged in the receiver to press the potatoes on the prongs. The pickers are then caused to release the piece of seed potato by striking against a knock-off bar, said seed being delivered to the ground. In such devices there is a means for opening a furrow wherever the seed potatoes are to fall and another device for closing the furrow.

The chief difficulty in the proper feeding of potatoes is that, if they are not fed regularly, there is a wasting of the potatoes or else irregular planting, owing to too many or too few being deposited from the pickers. This type of picker arm and planter is best disclosed in the United States patent to C. A. A. Rand 1,583,008 granted May 4, 1926, and filed August 9, 1924.

The main object of the invention is to provide a picker arm adaptable to work with any size of seed cutting and also to have adjustments wherein the picks may be set for small, medium or large seed cuttings, and also to increase the percentage of planting accuracy.

Another difficulty in feeding by means of pickers as above described is that the pickers in the past have not been adjustable as to the amount of projection of the pickers to empale the seed, so that, when small pieces of seed are desired, too many pieces would be delivered by the picks.

It is an object of this invention to provide a means for adjusting the amount of the protruding picks to avoid said difficulty, and the opening between the picks and the finger of the stripper plate.

In accomplishing the above objects and minor objects, which will hereinafter be more specifically described and then defined in the claims, the preferred forms of the improved details of structure are illustrated in the accompanying drawing, wherein:

Figure 1 is a side elevation showing the picker arm complete, mounted on the picker arm spider, and showing the picks in position for small seed;

Figure 2 is a front elevation of the picker arm and spider;

Figure 3 is a side elevation of the picker head with the picks in position for medium size seed;

Figure 4 is a side elevation of the picker arm head with the picks in position for large seed;

Figure 5 is a perspective view of the adjusting guide for the picks;

Figure 6 is a cross section of Figure 5 along section A—A viewed from the front, showing the adjusting guide, holes, and the picks in position for small seed;

Figure 7 is a view similar to Figure 6 with the picks in position for medium size seed;

Figure 8 is a view similar to Figure 6 with the picks in position for large seed; and, Figure 9 is an enlarged portion through the pick stud and picker arm on section 9—9 of Figure 1, looking in the direction of the arrows.

The invention is herein disclosed in combination with a potato planter as shown in the United States Patent 1,583,008 granted to C. A. A. Rand, May 5, 1926, in which the picker arm spider 10 is rotatably mounted on the rigid axle 11. The picker arm spider has lugs 12, to which is bolted the completed picker arm 13. The completed picker arm 13 comprises a bifurcated picker arm 14 with the potato stripper plate 15 movable in the bifurcated portion. The potato stripper plate 15 is pivoted about the pivot point 16 on the picker arm 14 and is limited in its movement by the slotted portion 17 of the stripper plate 15 engaging the stop 18 on the picker arm 14. In this manner, the stripper plate may be swung from maximum open position by gravity to its engaging position over the seed when the seed is engaged by the concaves of the potato planter. The bifurcated portion of the picker arm, between which the stripper plate pivots, is formed by the upper portion of the picker arm 14 and the side plate 19, which is riveted to the picker arm 14 through the lugs 16 and 18 and by the rivet 20. The forward portion of the stripper plate 15 has an enlarged finger engaging portion 21, best shown in Figure 2. The rear portion of the stripper plate 15 has a rearwardly extending heel piece 22, which engages the knock-off block on the potato planter when the seed is discharged to the seed chute.

Attached to the mid-portion of the stripper plate 15 is the adjusting guide and stripper portion 23 for the hair-pin shaped pick 24, which is adjustably mounted in the adjusting guide 23 for various sizes of seed at its outer end and pivotally snapped in place at its lower portion to the hair-pin stud 25 having a groove adapted to receive the complementary shaped portion of the pick 24 secured on the picker arm. The finger portion 21 and the stripper portion 23 are so proportioned to form a throat area for receiving the potato seed. A thumb piece 26 is bifurcated at its lower end and pivotally connected to the picker arm 14, and it is limited in its movement as it passes through the seed in the hopper by the stop 27, and as it passes through the seed in the uppermost position of the picker arm, the thumb piece falls and is limited in its movement by the stop portion 28 on the thumb piece 26. The thumb piece 26 has an enlarged surface portion similar to that of the enlarged finger portion 21 of the stripper plate. The thumb piece 26 is pivotally connected by the bifurcated portion formed by the thumb piece casting 26ᵃ and its side plate 29 to the reduced portion 30 of the picker arm 14. The thumb piece is used to prevent doubling; that is, the picking of more than one seed portion.

The mid-portion 31 of the completed picker arm 13 is so proportioned that the stud 25 with the hair-pin pick 24 thereon is centrally positioned laterally of the enlarged finger portion 21 and the thumb piece 26. The lower end of the completed picker arm 13 is secured to the lug 12 by the usual means of carriage head bolt and nut 32, and the lower end of the picker arm is shaped to conform to the periphery of the spider 10. Cut out portions 33 and 34 are located on the picker arm to accommodate the pawl rod 35 for the feed cam.

The number of these completed picker arms 13 that are used is six or eight, depending upon the gearing and mechanism used for the various plant spacings. These completed picker arms are placed in two groups of three or four, and laterally spaced on the spider.

Figure 5 is a perspective view showing the adjusting guide and stripper 23, which is U-shaped and formed with the outwardly extending portions 36 acting as the stripper. The members 36 incline outwardly from the stripper plate proportionally to the size of seed for the respective pick adjustments. The base portion of the adjusting guide 23 is best shown in Figures 6, 7, and 8, in which are shown a plurality of adjusting holes 37, 38, 39, 40, and 41, through which the prongs of the hair-pin pick 24 extend. Figure 6 shows the prongs of the hair-pin pick 24 in the holes 37 and 39, with the pick positioned as shown in Figure 1 for small seed. Figure 7 shows the adjusting guide 23 with the prongs of the hair-pin pick 24 placed in the holes 38 and 40 and the pick 24 in the position shown in Figure 3 for medium size seed. Figure 8 shows the adjusting guide 23 with the prongs of the hair-pin pick 24 in the holes 39 and 41 and the pick 24 positioned as shown in Figure 4 for large seed. The hair-pin pick 24 is adjusted in the various positions by using a screw-driver under the closed end portion of the pick 24, prying it off from the stud 25, adjusting it in the required position for whatever seed is to be used, replacing the pick in adjusted position, and snapping it into place over the stud 25. The hair-pin pick 24 is made of spring steel and bent, as shown in Figure 1, to provide retaining means for engaging the stud 25. The prongs of the pick are sharpened to a point in order to spear the seed properly.

It is thus seen that a picker arm has been made, which is adjustable for various sizes of potato seed, including small, medium, and large seed, that is sturdily constructed and very simple to adjust for each size of seed used.

In the operation of a potato planter, it will be seen that the picker arms are positioned to travel in slots of the concave between the sections of the magazine and that their action is to empale or pick seed potatoes as the individual arms pass through the mass of potatoes in the bottom of the magazine, lifting them up and around to the forward side of the magazine, where the heel piece 22 of the stripper plate 15 strikes an abutment on the frame, causing the potatoes to be stripped from the prongs of the pick 24 by the adjusting guide and stripper 23, and dropped. The thumb piece 26 is adapted to gauge the depth of the prongs when large seeds are used. The thumb piece also acts to steady the potato seeds on the picks 24. The enlarged finger portion 21 acts to center the seed prior to the empalement of the seed by the pick 24. The slot 17 limits the movement of the stripper plate 15 and also prevents the prongs of the pick 24 from becoming disengaged from the adjusting guide 23. The prongs of the pick are in the same plane and placed approximately one-half inch apart, so that the seed may be empaled without splitting the same and losing it from the pick as it travels through the mass of seed in the magazine of the potato planter.

It will be evident that there has been provided a completed picker arm for the spider of a potato planter which may be readily connected to and disconnected from the spider, and in which the pick of the picker arm may be readily adjusted for small, medium, and large seeds without removing the picker arm from the spider.

It is to be understood that materials suitable for the stresses encountered in a potato picker arm of this nature are to be used, and that the preferred embodiment of the invention herein described is capable of certain modifications without departure from the scope of the invention to be defined in the following claims.

What is claimed is:

1. In a potato planter, a picker comprising a picker arm, a stripper plate pivotally mounted on said picker arm comprising a finger portion and a heel portion, picking means mounted on said picker arm adapted for spearing potato seed, and means on said stripper plate cooperating with said picking means permitting the adjustment of the picking means whereby the picking means is adjusted for the size of the potato seed used.

2. In a potato planter, a picker comprising a picker arm, a stripper plate pivotally mounted on said picker arm comprising a finger portion and a stripper portion integral therewith forming a throat portion adapted to receive a potato seed, picking means mounted on said picker arm adapted for spearing potato seed, and means on the stripper plate permitting the adjustment of the picking means in the aforesaid throat portion whereby the picking means is adjusted to spear the potato seed in the mid-portion thereof according to the size of the potato seed used.

3. In a potato planter, a picker comprising a picker arm, a stripper plate pivotally mounted on said picker arm, picking means mounted on said picker arm adapted for spearing potato seed, a stripper portion integral with said stripper plate, and means on the stripper plate permitting the adjustment and retention of the picking means in adjusted position whereby the picking means is adjusted to properly spear the potato seed according to the size of the potato seed used.

4. In a potato planter, a picker comprising a picker arm, a stripper plate pivotally mounted on said picker arm, picking means pivotally mounted on said picker arm adapted for spearing potato seed, a stripper portion on said stripper plate, and means on said stripper portion permitting the adjustment of the aforesaid picking means whereby the picking means is adjusted to properly spear the potato seed according to the size of the potato seed used.

5. In a potato planter, a picker comprising a picker arm, a stripper plate pivotally mounted on said picker arm, picking means pivotally mounted on said picker arm adapted for spearing potato seed, a stripper portion on said stripper plate, means on said stripper portion permitting the adjustment of the aforesaid picking means, said adjusting means comprising a plurality of members adapted to receive the picking means in a plurality of adjusted positions, and means for preventing said picking means from being disengaged from the aforesaid stripper portion, whereby the picking means is adjusted to properly spear the potato seed according to the size of the potato seed used.

6. In a potato planter, a picker comprising a picker arm, a stripper plate having a finger portion pivotally mounted on said picker arm, picking means pivotally mounted on said picker arm adapted for spearing potato seed, a stripper portion on said stripper plate, means on said stripper portion permitting the adjustment of the aforesaid picking means, said stripper portion comprising an inclined stripping member adapted to surround the aforesaid picking means and inclined proportionally to be adapted for various sizes of seed, means on said stripper plate adapted to pivot said stripper plate, means on said picker arm for limiting said stripper plate; whereby, when a potato seed is stripped from the aforesaid picking means, the stripper portion clears the aforesaid picking means and retains the picking means in adjusted position.

7. In a potato planter, a picker comprising a picker arm, a stripper plate pivotally mounted on said stripper arm, picking means, means permitting the quick attachment and detachment of said picking means to the picker arm, the aforesaid picking means being hairpin shaped, and resilient, whereby the picking means may be readily attached and detached to the picker arm for a plurality of adjusted positions.

8. In a potato planter, a picker comprising a picker arm, a stripper plate pivotally mounted on said picker arm, picking means, attaching means on said picker arm adapted for quickly attaching and detaching said picking means thereto, and said picking means comprising means adapted for quickly attaching and detaching the picking means to the aforesaid attaching means on said picker arm, the aforesaid picking means comprising a plurality of spears in the same plane, pivoting means formed by the spears for pivoting said picking means whereby said picking means may be attached to the aforesaid attaching means on the picker arm, said pivoting means being offset to the center line of the spears, whereby said picking means may be reversed in position to adjust the picking means for various seed sizes, and adjusting means on the stripper plate to receive the spears of the picking means in adjusted position.

ARNOLD E. W. JOHNSON.
JOSEPH I. MITCHELL.